United States Patent [19]
Akiba

[11] Patent Number: 6,111,838
[45] Date of Patent: *Aug. 29, 2000

[54] DISK EJECTION MECHANISM WITH SLIDABLE EJECT SWITCH

[75] Inventor: Takao Akiba, Ohmiya, Japan

[73] Assignee: Teac Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/904,240

[22] Filed: Jul. 31, 1997

Related U.S. Application Data

[63] Continuation of application No. 08/624,887, Mar. 27, 1996, abandoned.

[30] Foreign Application Priority Data

Feb. 9, 1996 [JP] Japan ...................................... 8-024463
Feb. 28, 1996 [JP] Japan ...................................... 8-041930

[51] Int. Cl.[7] .................................................. G11B 33/02
[52] U.S. Cl. ........................................................... 369/77.1
[58] Field of Search ............................... 360/99.06, 96.3; 369/77.1, 77.2

[56] References Cited

U.S. PATENT DOCUMENTS

| | | | |
|---|---|---|---|
| 4,665,454 | 5/1987 | Tsuchiya et al. | 360/99.06 |
| 4,870,518 | 9/1989 | Thompson et al. | 360/99.06 |
| 4,878,139 | 10/1989 | Hasegawa et al. | 360/99.06 |
| 5,291,356 | 3/1994 | Matsumoto et al. | 369/77.2 |
| 5,583,834 | 12/1996 | Kanada et al. | 369/13 |
| 5,883,870 | 3/1999 | Akiba et al. | 369/77.1 |

*Primary Examiner*—David Davis
*Attorney, Agent, or Firm*—Ladas & Parry

[57] ABSTRACT

A disk ejection mechanism includes a tray on which a recording disk is held, the tray being arranged so that the tray is movable between an inserted position and a disk-change position in both an insert direction and an eject direction. A tray locking member locks the tray when the tray is at the inserted position. A tray pushing member pushes the tray in the eject direction by an actuating force, the tray being ejected by the tray pushing member when the tray is unlocked from the tray locking member. A slidably-arranged eject switch, associated with the tray locking member, unlocks the tray from the tray locking member when the eject switch is moved in a direction perpendicular to both the insert direction and the eject direction.

4 Claims, 18 Drawing Sheets

DISK EJECTION MECHANISM WITH SLIDABLE EJECT SWITCH

This is a continuation of application Ser. No. 08/624,887 filed on Mar. 27, 1996, abandoned.

BACKGROUND OF THE INVENTION (1) Field of the Invention

The present invention generally relates to disk ejection mechanism of a disk drive, and more particularly to a disk ejection mechanism of a disk drive, installed in a casing of a personal computer, wherein a disk tray is ejected when an eject operation is performed by an operator on the personal computer.

(2) Description of the Related Art

FIG. 1 shows a conventional CD-ROM disk drive. This CD-ROM disk drive is a built-in type that is installed in a casing of a notebook-size personal computer for use and operation. A CD-ROM (Compact Disk-Read-Only Memory) is a type of optical disk which is capable of storing large amounts of information. The CD-ROM is accessed by an optical pickup of the CD-ROM disk drive in order to reproduce information on the CD-ROM.

In the above optical disk drive, a tray 1 on which an optical disk (not shown) is held is movably supported. The tray 1 is movable in forward and rearward directions (indicated by arrows A and B in FIG. 1) of the optical disk drive. The movement of the tray 1 is actuated by a manual operation.

The tray 1 includes an opening 1a. A turn table 2 is provided under the opening 1a of the tray 1, and the optical disk on the tray 1 is held by the turn table 2. Since the turn table 2 is rotated by a spindle motor (not shown in FIG. 1), the optical disk on the tray 1 is rotated by the turn table 2. An optical pickup 3 which optically reads out information on the optical disk is provided under the opening 1a of the tray 1.

A disk ejection mechanism included in the above optical disk drive performs an ejecting action of the tray 1 when a pushdown eject button 4 is pushed, so that the optical disk on the tray 1 can be taken out by the operator. The eject button 4 is provided on, for example, a front bezel in front of the tray 1. When the tray 1 is placed at its inserted position, a lock lever 5, which is supported on the bottom of the tray 1, is connected with a pin 6 provided on a chassis 10. The tray 1 at the inserted position is locked by the lock lever 5 connected with the pin 6. The pin 6 is fixed on the chassis 10.

The lock lever 5 has an L-shaped cross-section. The lock lever 5 has a hook portion 5a at one end, and a contact portion 5b at the other end. When the tray 1 is placed at the inserted position, the hook portion 5a of the lock lever 5 is connected with the pin 6, and the contact portion 5b of the lock lever 5 is brought into contact with a rear surface of the eject button 4.

The lock lever 5 further includes a supporting shaft 5c. The lock lever 5 is rotatably supported on the supporting shaft 5c such that the lock lever 5 is rotatable around the supporting shaft 5c in a horizontal plane. A coil spring 7 is connected to an intermediate portion of the lock lever 5, and an actuating force to rotate the lock lever 5 in a clockwise direction around the supporting shaft 5c is exerted by the coil spring 7 such that the hook portion 5a is forced toward the pin 6.

A tray pushing member which pushes the tray 1 in the forward direction "A" is provided at a rear portion of the tray 1. When ejecting the tray 1 from the chassis 10, the tray pushing member pushes the tray 1 so that the tray 1 is moved from the inserted position in the forward direction "A" by a predetermined distance. This facilitates the operator to further pull out the tray 1 from the chassis 10. In this tray pushing member, a pair of projections 1c extending downward from the bottom of the tray 1 are provided. A pushing lever 8 having an opening is fixed on the chassis 10. The tray 1 is slidably supported by the projections 1c connected with the opening of the pushing lever 8. A coil spring 9 is connected to the chassis 10 and the tray 1, and an actuating force to push the tray 1 in the forward direction "A" is exerted by the coil spring 9 on the tray 1.

When the tray 1 is inserted into the optical disk drive, an end 8a of the pushing lever 8 is brought into contact with a rear inside wall 10a of the chassis 10. When the tray 1 is at the inserted position, the coil spring 9 is stretched by a length that is the same as a length of an extending portion of the pushing lever 8 projecting from the rear end of the tray 1.

FIG. 2 shows the conventional CD-ROM disk drive when the eject button 4 is pushed. As shown in FIG. 2, the lock lever 5 is rotated counterclockwise around the supporting shaft 5c when the eject button 4 is pushed down. The hook portion 5a of the lock lever 5 is released from the pin 6 on the chassis 10.

FIG. 3 shows the conventional CD-ROM disk drive when the tray 1 is ejected from the chassis 10. When the tray 1 is at the position shown in FIG. 3, the front bezel 1b in front of the tray 1 is distant from the front end of the chassis 10 by a predetermined length "L". This facilitates the operator to further pull out the tray 1 from the chassis 10, so that the optical disk on the tray 1 can be taken out by the operator. The operator can change the optical disk by a new optical disk after the tray 1 is further pulled out from the chassis 10. The position to which the tray 1 is further pulled out so as to make the optical disk on the tray 1 fully exposed, is referred to as a disk-change position.

Further, in the conventional CD-ROM disk drive, it is necessary that the eject button 4 has a relatively large height on the front bezel 1b, or it has a relatively large size enough to allow for an easier manipulation of the eject button 4.

However, in the case of the conventional optical disk drive, the eject button 4 is provided on the front surface or the side surface of the notebook-size personal computer. Therefore, it is possible that the operator on the personal computer erroneously touch the eject button 4 when the optical disk is being accessed by the CD-ROM disk drive 11. Since the pushdown eject button 4 has a short stroke that is needed to actuate the tray for the ejecting action, it is likely that the ejecting action of the tray 1 is actuated in such a case even when a pressing force acting on the push button 4 is slight.

If the eject button 4 is inadvertently pushed down when the optical disk is being accessed by the pickup 3, the tray 1 is moved in the forward direction A and the unlocking of the lock lever 5 is actuated. There is a problem that a reading action of the pickup 3 is interrupted by the movement of the tray 1.

Further, it is possible that the eject button 4 be inadvertently pushed down by a person when the personal computer is carried by the person. In such a case, the tray 1 is moved in the forward direction A so that the tray 1 outwardly projects from the chassis 10. The tray 1 outwardly projecting from the chassis 10 is likely to be damaged or deformed by an external force by accident.

One method for resolving the above-mentioned problems is to provide a locking mechanism which is installed in a disk drive and locks the eject button 4 when the disk drive is operated or carried. The locking mechanism installed in the disk drive can lock the eject button 4 when the disk drive is operated or carried, in order to prevent the disk tray from being erroneously ejected. However, the disk drive in which the locking mechanism is installed must have a complicated structure. In addition, it is necessary for the operator to perform an unlocking operation of the locking mechanism to unlock the eject button 4 before the eject button 4 is pushed down to eject the disk from the disk drive. The locking and unlocking of the eject button 4 is not useful for the operator and become annoying operations for the operator.

SUMMARY OF THE INVENTION

An object of the present invention is to provide an improved disk ejection mechanism in which the above-described problems are eliminated.

Another object of the present invention is to provide a disk ejection mechanism which has a simple structure and effectively prevents the erroneous ejection of the disk tray from the disk drive.

Still another object of the present invention is to provide a disk ejection mechanism which is useful for the operator to easily perform the eject operation on the disk drive to eject the disk tray from the disk drive.

The above-mentioned objects of the present invention are achieved by a disk ejection mechanism of a disk drive, which includes: a tray on which a recording disk is held, the tray being arranged in the disk drive so that the tray is movable between an inserted position and a disk change position in both an insert direction and an eject direction; a tray locking member locking the tray when the tray is at the inserted position; a tray pushing member pushing the tray in the eject direction by an actuating force, the tray being ejected by the tray pushing member when the tray is unlocked from the tray locking member; and a slidably-arranged eject switch, associated with the tray locking member, unlocking the tray from the tray locking member when the eject switch is moved in a direction perpendicular to both the insert direction and the eject direction.

Since the eject switch in the disk ejection mechanism of the present invention is not the push-down type eject button in the conventional disk ejection mechanism, it is possible to effectively prevent the erroneous ejection of the disk tray when the operator inadvertently touches the eject switch at the time the disk drive is being operated or carried. It is possible that the disk ejection mechanism of the present invention installed in the disk drive has a simple structure, which enables to design a disk drive having a smaller size and/or a smaller height. Further, it is possible that the disk ejection mechanism of the present invention provide an easy eject operation for the operator on the disk drive to eject the disk tray from the disk drive.

BRIEF DESCRIPTION OF THE DRAWINGS

Other objects, features and advantages of the present invention will be more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1:
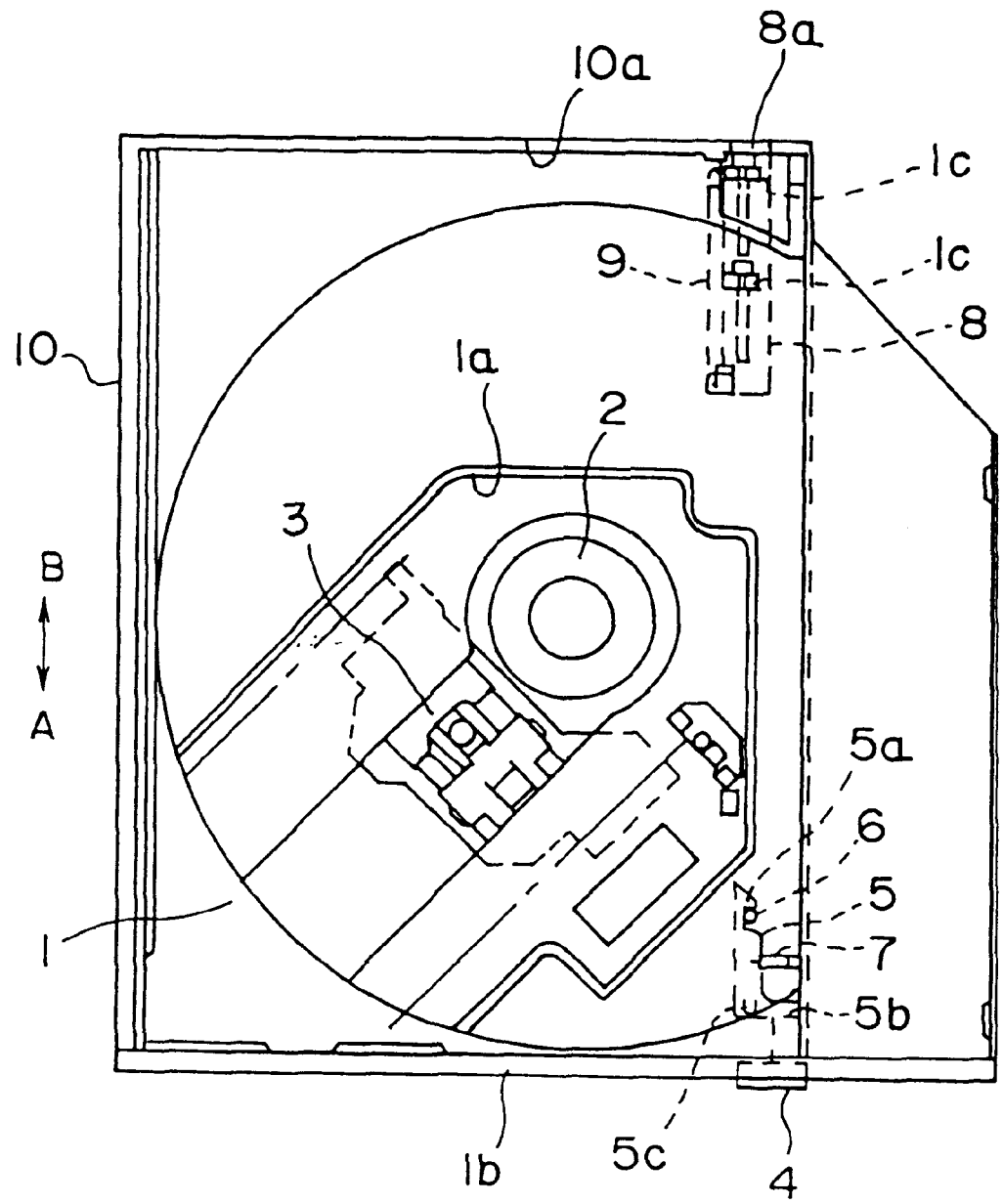
FIG. 1 is a top view of a conventional optical disk drive including a disk ejection mechanism.
Figure 2:
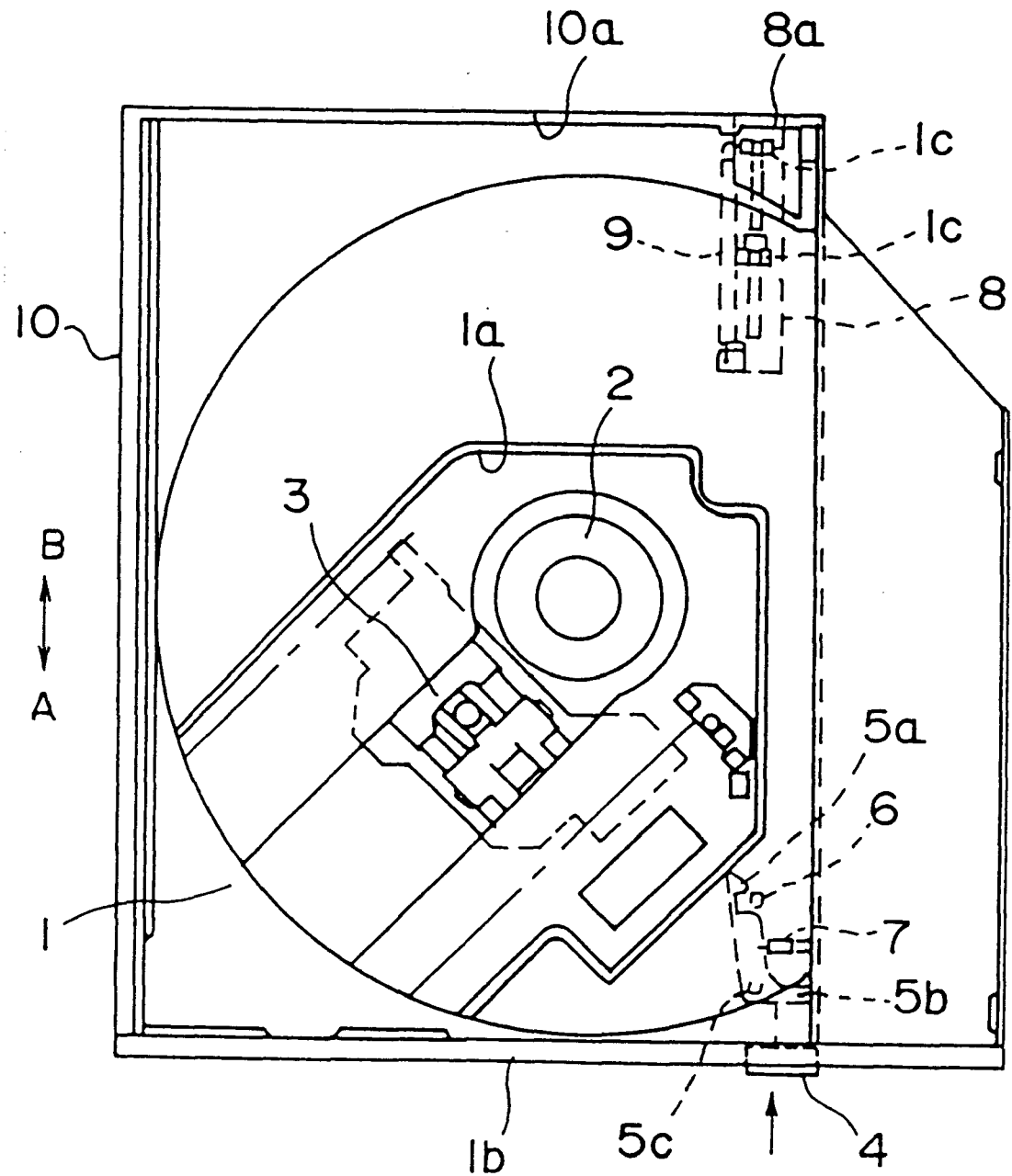
FIGS. 2 and 3 are top views of the conventional optical disk drive for explaining operations of the disk ejection mechanism in FIG. 1.
Figure 3:
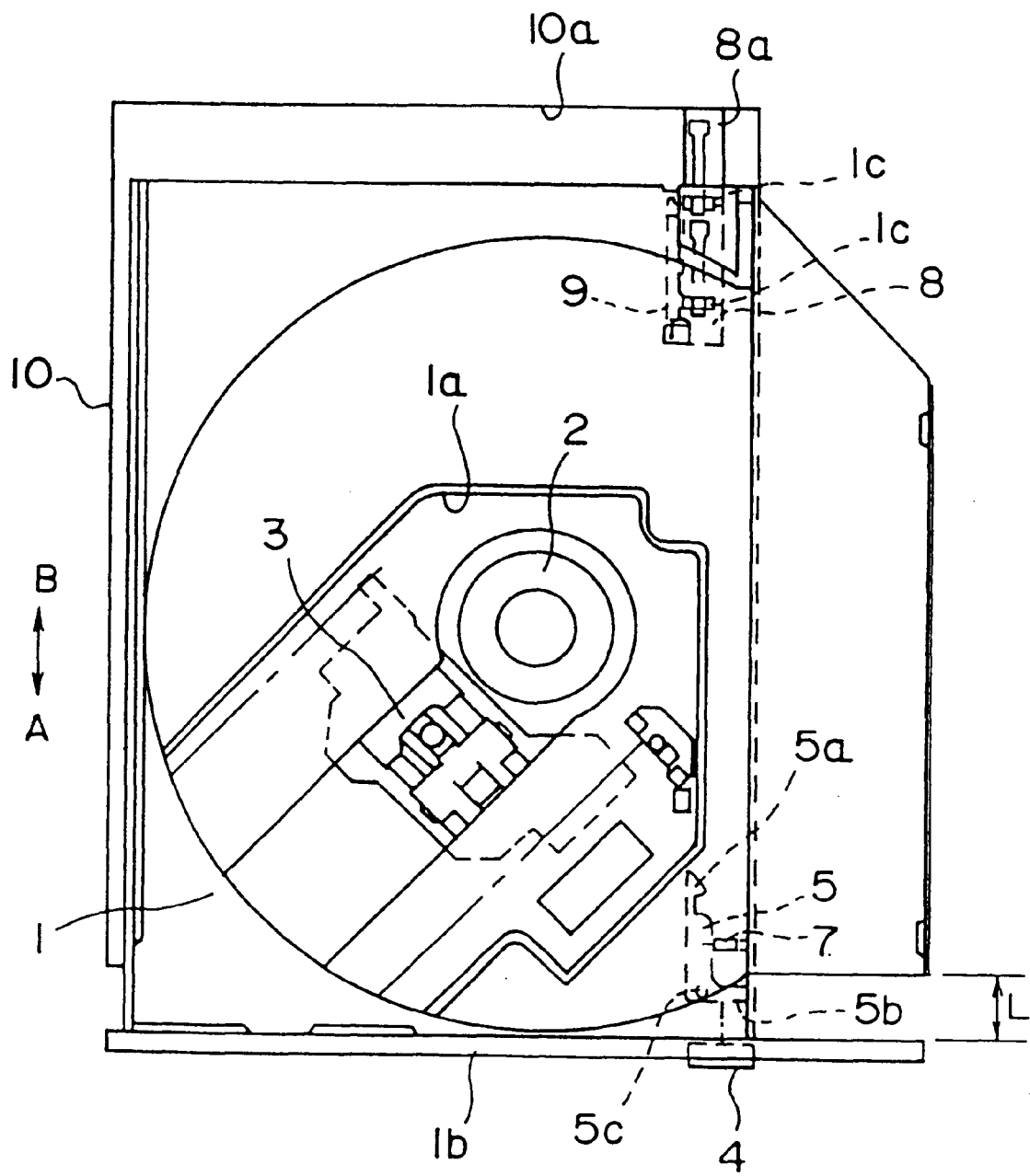
Figure 4:
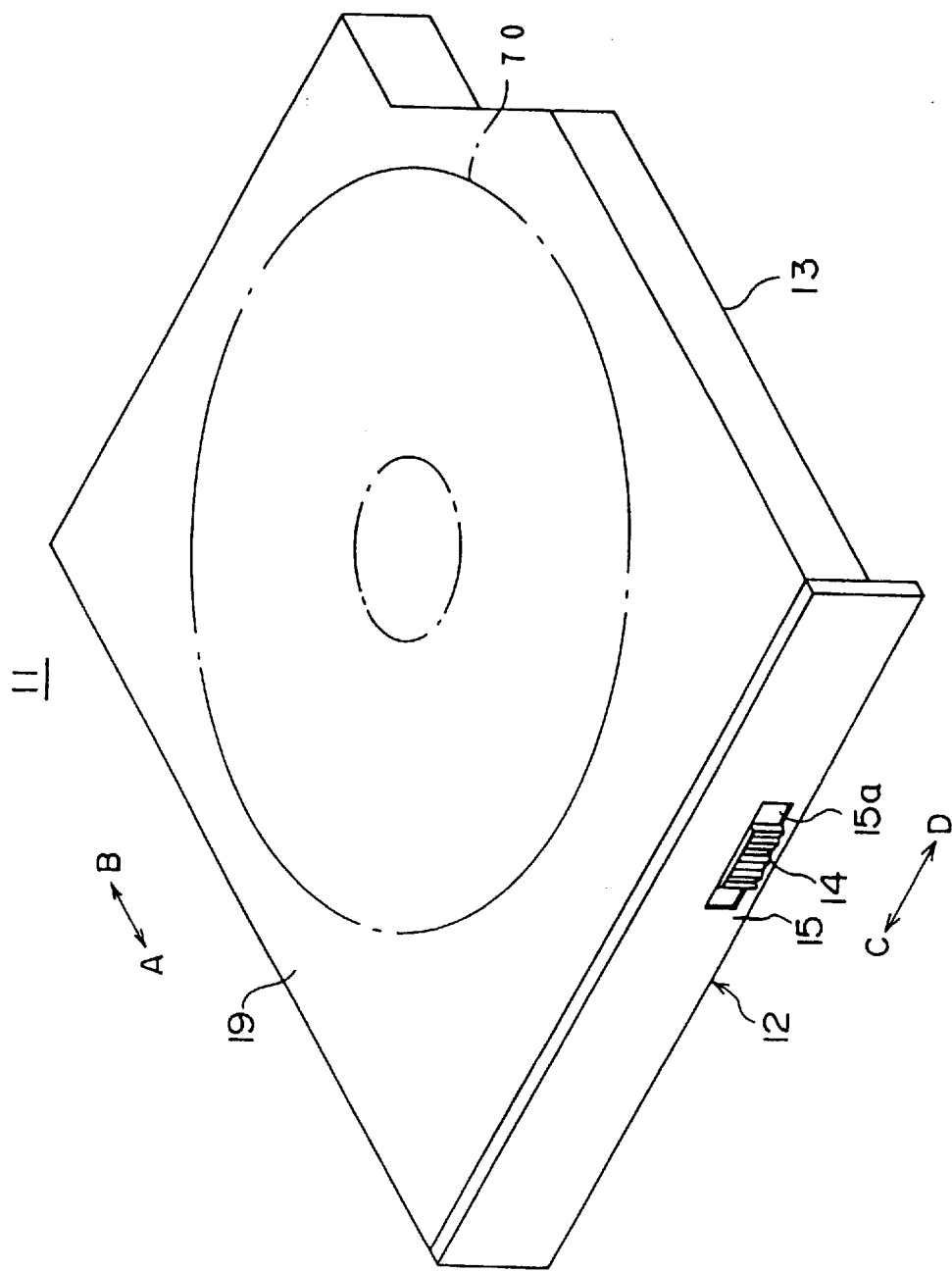
FIG. 4 is a perspective view of an optical disk drive in which a disk ejection mechanism in one embodiment of the present invention is included.

FIG. 4 shows a CD-ROM disk drive 11 to which a disk ejection mechanism in one embodiment of the present invention is applied. The CD-ROM disk drive 11 is a built-in type that is built in a notebook-size personal computer (not shown) for use and operation. A CD-ROM is accessed by an optical pickup of the CD-ROM disk drive 11 in order to reproduce information on the CD-ROM.

Referring to FIG. 4, a tray 12 on which an optical disk 70 (which is, for example, the CD-ROM) is held is slidably arranged within the disk drive 11 such that the tray 12 is movable between an inserted position and a disk-change position in both an insert direction and an eject direction. The eject direction and the insert direction are indicated by the arrow A and the arrow B in FIG. 4, respectively.

When the tray 12 on which the optical disk 70 is held is placed into the disk drive 11, the tray 12 is locked at the inserted position within a frame 13 of the disk drive 11.

A front bezel 15 is provided in front of the tray 12. A rectangular mounting hole 15a is formed on a right side of the front bezel 15. The mounting hole 15a extends on the front bezel 15 in transverse right and left directions of the disk drive 11. The right direction and the left direction are indicated by the arrow D and the arrow C in FIG. 4, respectively.

A slide-type eject switch 14 is provided on the front surface of the tray 12, and the eject switch 14 is slidable along the mounting hole 15a in both the right and left directions D and C. An actuating force to laterally push the eject switch 14 in the right direction D is exerted. When ejecting the optical disk 70 on the tray 12 from the disk drive 11, the operator slides the eject switch 14 in the left direction C against the actuating force.

Since the eject switch 14 is provided on the front surface of the tray 12 in the present embodiment, the operator can easily manipulate the eject switch 14, and the present embodiment provides an increased operability of the ejection of the optical disk 70 from the disk drive 11.

The eject switch 14 in the present embodiment is slidable in both the right and left directions D and C of the disk drive 11, and an erroneous movement of the eject switch 14 in the direction C is avoided even when the eject switch 14 is inadvertently touched by the operator. It is possible to prevent the tray 12 from being erroneously ejected from a chassis 18 of the disk drive 11 when the eject switch 14 is inadvertently touched by the operator.

Figure 5:
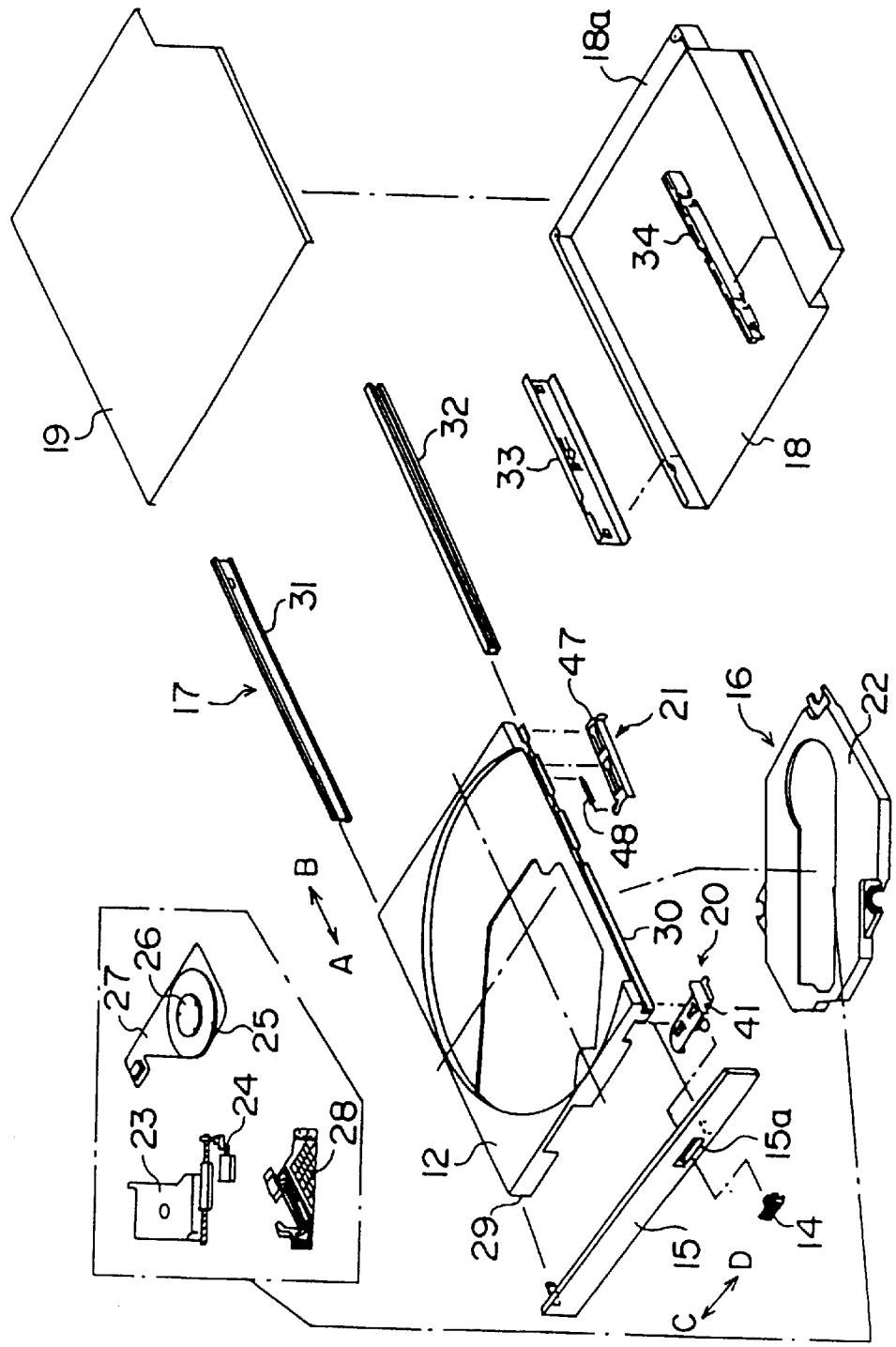
FIG. 5 is an exploded perspective view of the optical disk drive in FIG. 4.

FIG. 5 is an exploded perspective view of the CD-ROM disk drive 11 in FIG. 4.

Referring to FIG. 5, the CD-ROM disk drive 11 generally has the tray 12, a drive unit 16, a tray guide 17, the chassis 18, and a top plate 19. The drive unit 16 is provided under the tray 12 and fixed thereto. The tray guide unit 17 supports a sliding movement of the tray 12 when the tray 12 is moved in both the eject and insert directions A and B. The chassis 18 supports the tray 12. The top plate 19 covers the top of the tray 12, and the top plate 19 is fixed to the chassis 18.

The tray 12 has a lateral width smaller than an outside diameter of the optical disk 70. When the optical disk 70 is held on the tray 12, the optical disk 70 outwardly projects from the right-side edge of the tray 12. By a manual operation, the tray 12 can slide between the disk-change position and the inserted position in both the eject direction A and the insert direction B.

The CD-ROM disk drive 11 of the present embodiment does not include a moving member which automatically moves the tray 12 in the eject and insert directions A and B. Since the total number of parts required for the disk drive 11 can be reduced, the present embodiment makes it possible to design a disk drive having a smaller size and a smaller height.

A tray locking member 20 is provided at a front right corner portion of the bottom of the tray 12. The eject switch 14 on the front bezel 15 is connected to the tray locking member 20. A tray pushing member 21 is provided at a rear right corner of the bottom of the tray 12, and this tray pushing member 21 pushes the tray 12 in the eject direction A by an actuating force of a coil spring.

The drive unit 16 includes a base 22 provided under the tray 12. As indicated by a dotted chain line in FIG. 5, in the drive unit 16, a pickup 23, a pickup drive unit 24, a spindle motor 25, a turn table 26, a board 27, and a flexible printed circuit board 28 are provided. These elements of the drive unit 16 are mounted on the base 20. The pickup 23 optically reads out information on the optical disk 70. The pickup drive unit 24 moves the pickup 23 in a radial direction of the optical disk 70. The turn table 26 is rotated by the spindle motor 25 on the board 27, so that the optical disk 70 held by the turn table 20 is rotated. The flexible printed circuit board 28 electrically connects the pickup 23 and the spindle motor 25 on the board 27.

A tray guide member 17 includes a pair of slide rails 31 and 32. The slide rails 31 and 32 are slidably connected with side edges 29 and 30 of the tray 12 on both sides thereof. The slide rails 31 and 32 are movable relative to the chassis 18 in both the eject and insert directions A and B. The tray guide member 17 includes guide units 33 and 34 which are fixed to internal side walls of the chassis 18. The slide rails 31 and 32 are slidably held by the guide units 33 and 34 such that the tray 12 is slidably supported.

When the tray 12 is pulled out from the chassis 18 in the eject direction A by the operator, the slide rails 31 and 32 are moved in the eject direction A by the movement of the tray 12. By a manual operation of the operator, the tray 12 is further pulled out in the eject direction A to the disk-change position. The tray 12 at this time is held by the slide rails 31 and 32 via the guide units 33 and 34 on the chassis 18.

Figure 6:
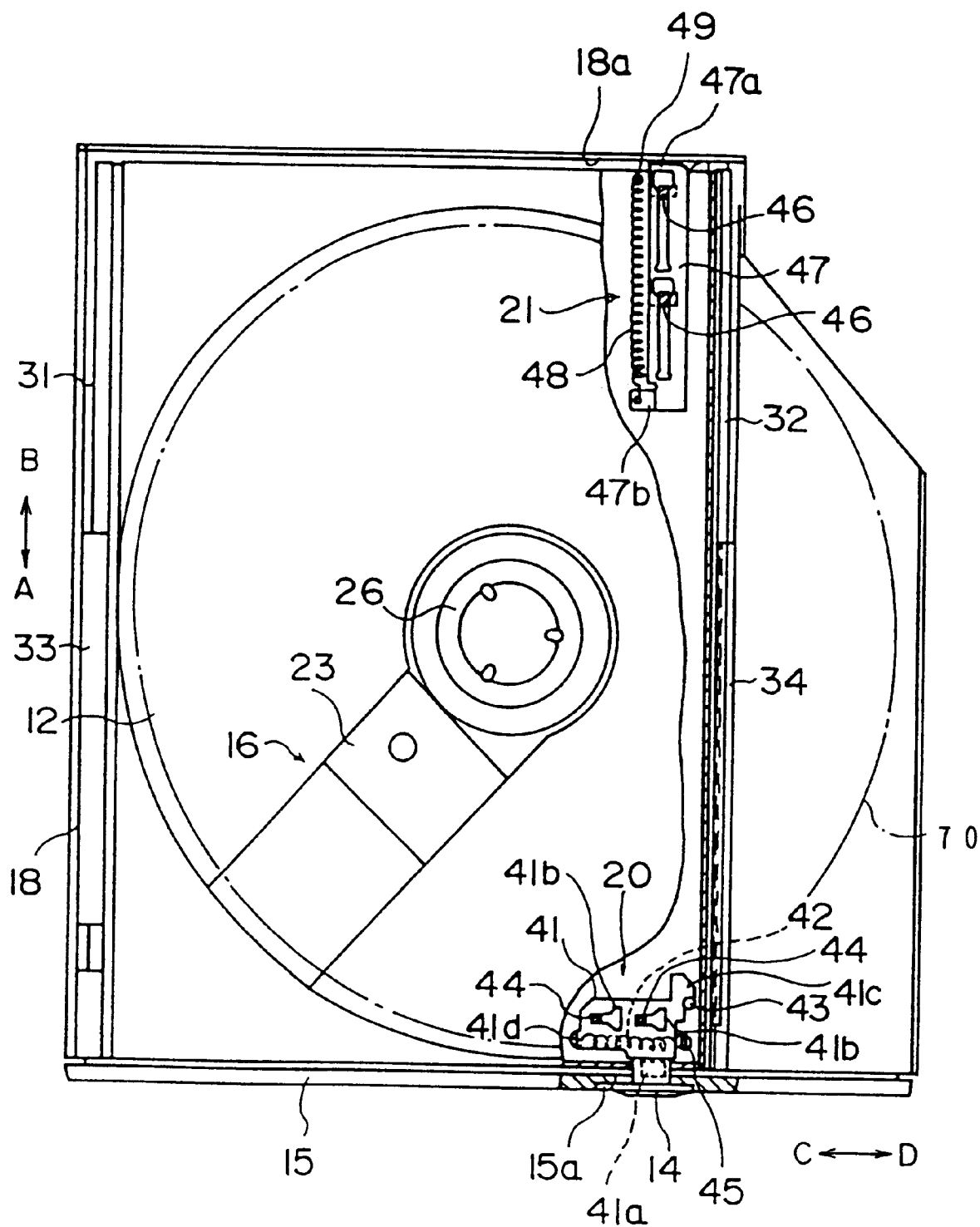
FIG. 6 is a top view of the optical disk drive when a tray is locked at an inserted position.

FIG. 6 shows the CD-ROM disk drive 11 including the tray locking member 20 and the tray pushing member 21 when the tray 12 is locked at the inserted position.

Referring to FIG. 6, the tray locking member 20 is provided at the front right corner of the bottom of the tray 12 such that the tray locking member 20 does not interfere with the optical disk 70 on the tray 12. As described above, the tray locking member 20 is moved by the sliding movement of the eject switch 14 when the eject switch 14 on the front bezel 15 is slid by the operator.

The tray locking member 20 generally has a lock lever 41, a coil spring 42, and a pin 43. The lock lever 41 is provided under the tray 12 and movably supported such that the lock lever 41 is movable in both the right and left directions D and C. An actuating force to pull the lock lever 41 in the direction D is exerted by the coil spring 42. The pin 43 is embedded on the chassis 18 and fixed thereto. A pair of projections 44 extending downward from the bottom of the tray 12 are provided and fixed onto the tray 12. A hook portion 45 extending upward from the chassis 18 is fixed onto the chassis 18. One end of the coil spring 42 is connected to the hook portion 45, and this end of the coil spring 42 is fixed to the chassis 18.

The lock lever 41 includes a connecting portion 41a, a pair of slide openings 41b, a locking portion 41c, and a hook portion 41d. The eject switch 14 is connected to the connecting portion 41a. The projections 44 on the bottom of the tray 12 are fitted in the slide openings 41b of the lock lever 41, and the lateral movement of the tray locking member 20 in the right or left direction is restricted by the slide openings 41b. The locking portion 41c of the lock lever 41 is connected with the pin 43 on the chassis 18. The other end of the coil spring 42 is connected to the hook portion 41d, and this end of the coil spring 42 is fixed to the lock lever 41.

The lock lever 41 is slidably supported such that the lock lever 41 is movable in both the directions D and C, and the actuating force of the coil spring 42 to pull the lock lever 41 in the direction D is exerted. The locking portion 41c is connected with the pin 43 such that the lock lever 41 is held at this position by the actuating force of the coil spring 42.

When the tray 12 is placed at the inserted position, the tray locking member 20 is capable of locking the tray 12 at the inserted position. The locking portion 41c of the lock lever 41, which is supported on the bottom of the tray 12, is connected with the pin 43 fixed onto the chassis 18.

When the eject switch 14 is slid in the direction C by the operator, the tray locking member 20 is moved in the direction C by the sliding movement of the eject switch 14. By this movement of the tray locking member 20, the locking portion 41c reaches a releasing point and the locking portion 41c is unlocked from the pin 43.

The tray locking member 20 is arranged such that the lock lever 41 slides in both the directions D and C by the sliding movement of the eject switch 14, and the tray locking member 20 has a relatively small height. Accordingly, the disk ejection mechanism of the present embodiment provides a reduction of the total height of the disk drive 11.

The tray pushing member 21 includes a pair of projections 46, a push lever 47, a coil spring 48, and a pin 49. The projections 46 extending downward from the bottom of the tray 12 are provided on the tray 12. The pin 49 extending downward from the bottom of the tray 12 is provided on the tray 12. The push lever 47 has a pair of holes and a hook portion 47b at a front end of the push lever 47. The push lever 47 has a rear end 47a. The rear end 47a of the push lever 47 is brought into contact with an inside rear wall of the chassis 18 when the tray 12 is placed into the inserted position. The projections 46 of the tray 12 are fitted into the holes of the push lever 47. The coil spring 48 has one end connected to the hook portion 47b of the push lever 47, and the other end connected to the pin 49 of the tray 12. One end of the coil spring 48 is fixed to the push lever 47, and the other end of the coil spring 48 is fixed to the tray 12.

Accordingly, the tray 12 is slidably supported on the push lever 47 to be slidable in both the directions A and B, and the tray pushing member 21 moves the tray 12 in the direction A by the actuating force of the coil spring 48 when the lock lever 41 is unlocked. Since the actuating force of the coil spring 48 in the eject direction A is exerted, the actuating force of the coil spring 48 does not act to move the lock lever 41 and the tray locking member 20 in the directions D and C that are perpendicular to both the directions A and B.

Figure 7:
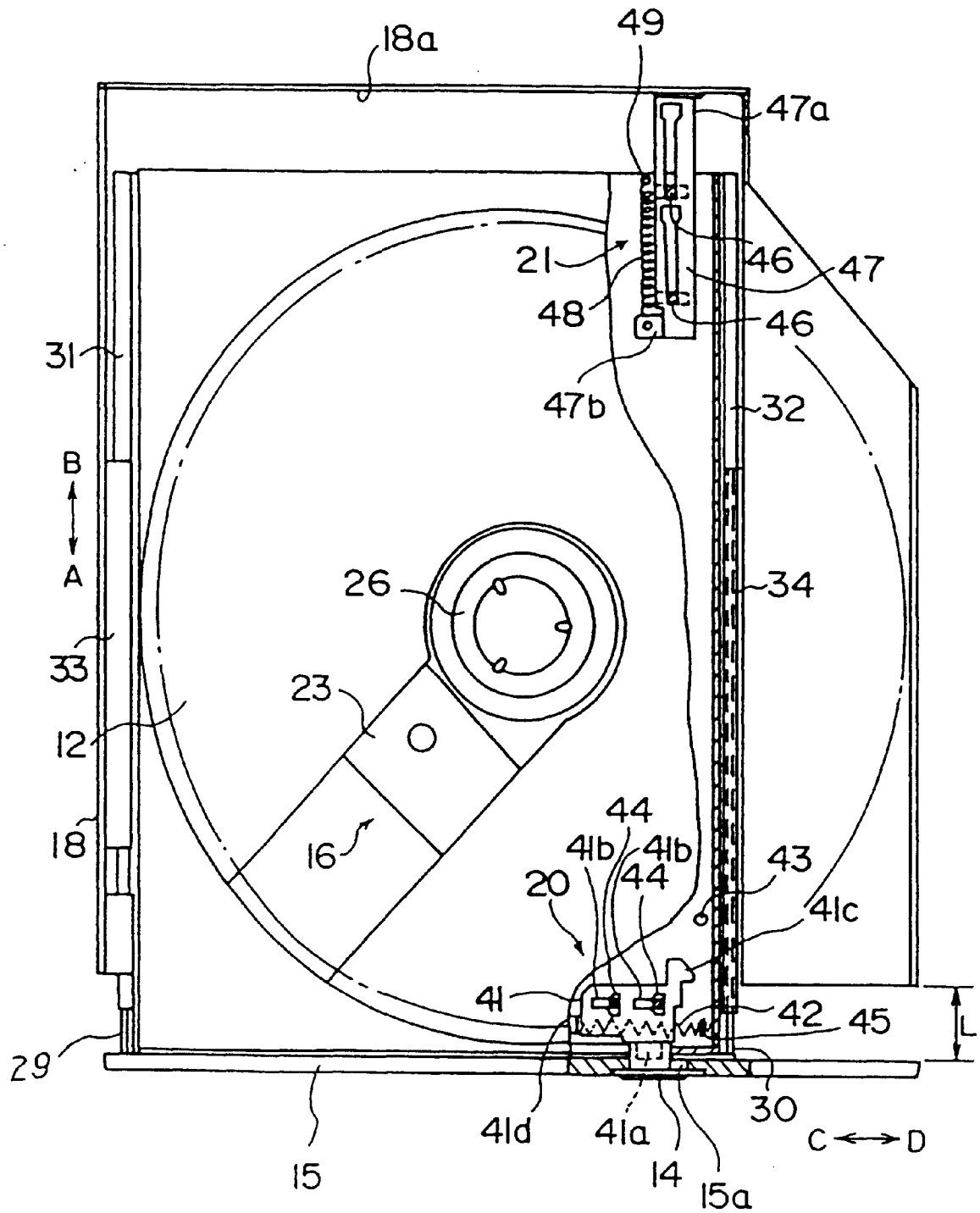
FIG. 7 is a top view of the optical disk drive when an eject switch is moved in the left direction from an initial position.
Figure 8:
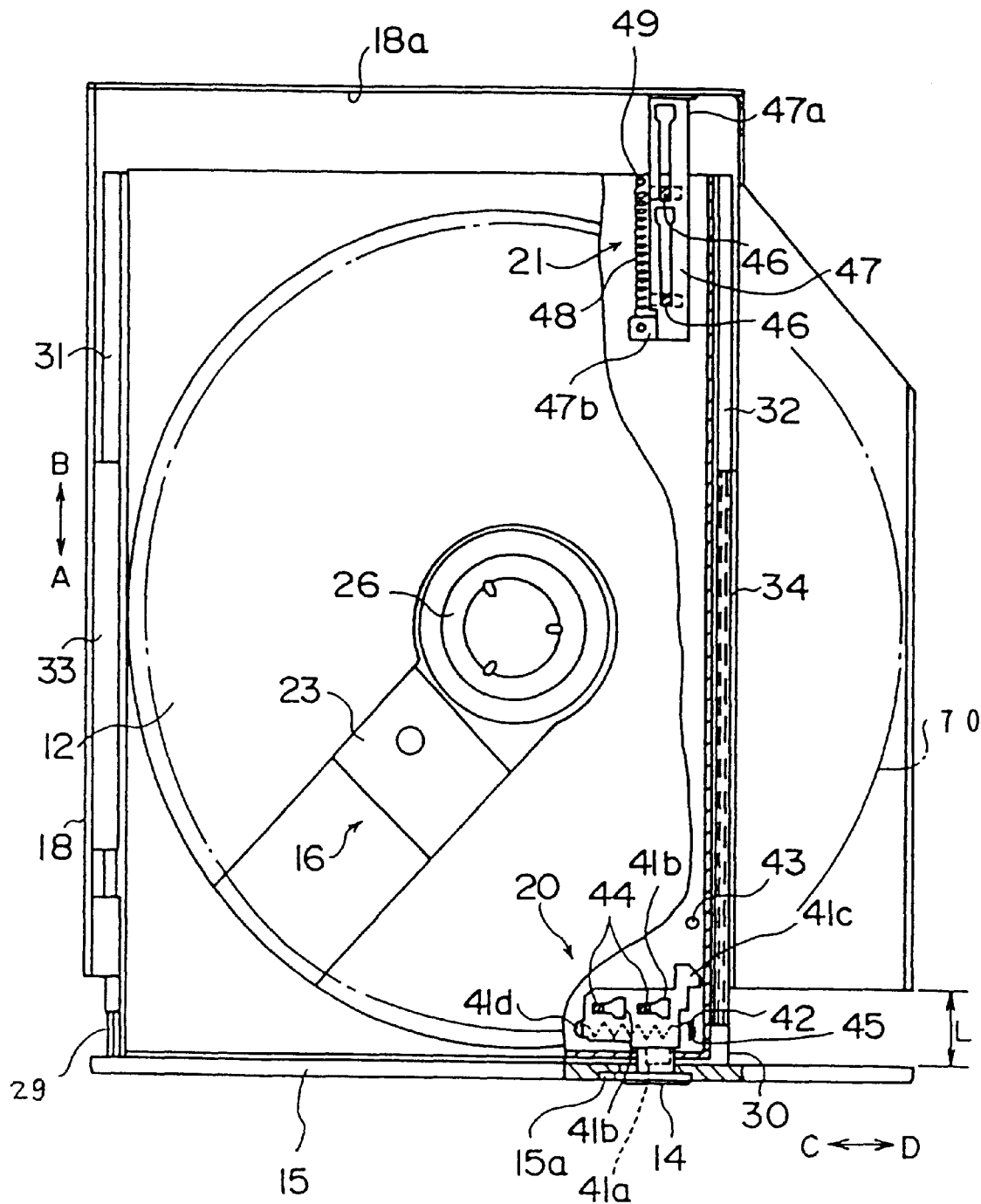
FIG. 8 is a top view of the optical disk drive when the eject switch is returned back in the right direction.

Next, a description will be given of the operations of the tray locking member 20 and the tray pushing member 21. FIG. 7 shows the disk drive 11 when the eject switch 14 is slid in the direction C. FIG. 8 shows the disk drive 11 when the eject switch 14 returns back to the initial position.

As shown in FIG. 7, when the eject switch 14 is slid in the direction C by the operator, the lock lever 41 is also moved in the direction C by the sliding movement of the eject switch 14. The locking portion 41c of the lock lever 41 is released from the pin 43 on the chassis 18. Thus, the lock lever 41 is unlocked from the pin 43 when the eject switch 14 is slid in the direction C by the operator.

The push lever 47 of the tray pushing member 21 pushes the inside rear wall 18a of the chassis 18 in the direction B due to the actuating force of the coil spring 48. The coil spring 48 has one end connected to the push lever 47 and the other end connected to the tray 12. Therefore, when the lock lever 41 is unlocked from the pin 43, the tray 12 is moved in the direction A by the reaction from the inside rear wall 18a of the chassis 18. Thus, the tray 12 is ejected from the chassis 18 in the direction A at the position shown in FIG. 7.

After the ejection operation of the tray 12 is performed, the front bezel 15 in front of the tray 12 is at a predetermined distance L from the front end of the chassis 18 as shown in FIG. 7. This facilitates the operator to further pull out the tray 12 from the chassis 18, to the disk-change position.

As shown in FIG. 8, when the operator releases the eject switch 14, the eject switch 14 and the tray locking member 20 are moved back in the direction D by the actuating force of the coil spring 42. The coil spring 42 has one end connected to the lock lever 41 and the other end connected to the chassis 18. After the optical disk is changed at the disk-change position, the front bezel 15 in front of the tray 12 is pushed in the direction B by the operator. When the tray 12 is further pushed in the direction B from the position shown in FIG. 8, the locking portion 41c of the lock lever 41 comes into contact with and is then connected with the pin 43 on the chassis 18. When the tray 12 is placed again at the inserted position, the lock lever 41 is locked by the connection of the locking portion 41c and the pin 43.

Figure 9:
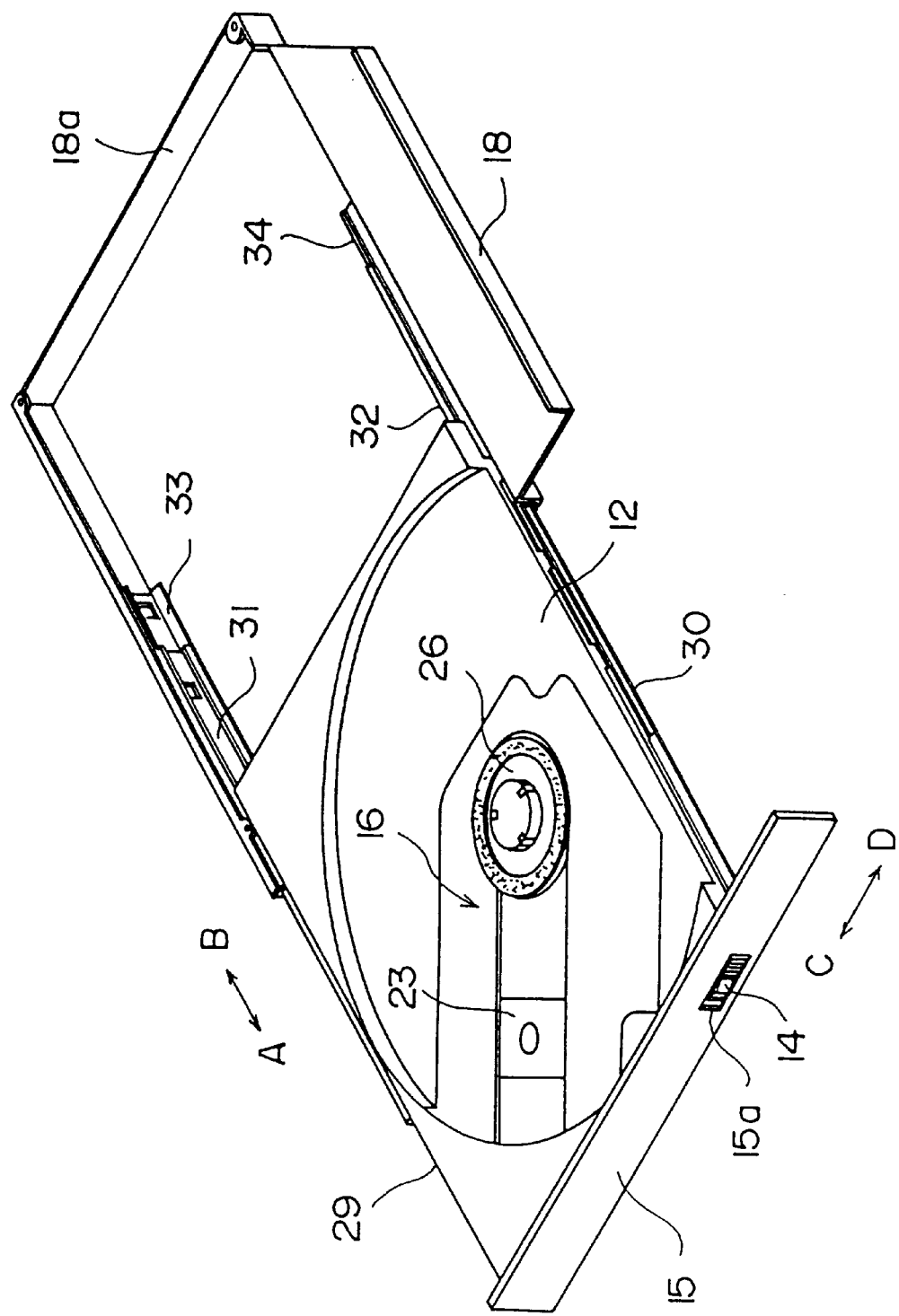
FIG. 9 is a perspective view of the optical disk drive in FIG. 4 when the tray is pulled out to a disk-change position.

FIG. 9 shows the CD-ROM disk drive 11 when the tray 12 is pulled out to the disk-change position.

As described above, after the ejection operation of the tray 12 is performed, the front bezel 15 in front of the tray 12 is at the predetermined distance L from the front end of the chassis 18 as shown in FIG. 7. Then, the operator grips the front bezel 15 and further pulls out the tray 12 in the direction A from the position shown in FIG. 7. By this operation, the slide rails 31 and 32 which support the side edges of the tray 12 slide in the direction A, and the tray 12, which is held by the guide units 33 and 34 via the slide rails 31 and 32, is slid in the direction A to the disk-change position.

When the tray 12 is moved to the disk-change position, the optical disk, held by the turn table 26, is exposed. After the optical disk is changed at this disk-change position, the front bezel 15 in front of the tray 12 is pushed in the direction B by the operator. When the tray 12 is further pushed in the direction B from the position shown in FIG. 8, the locking portion 41c of the lock lever 41 comes into contact with and is then connected with the pin 43 on the chassis 18. The tray 12 is placed again at the inserted position shown in FIG. 6, and the lock lever 41 is locked by the locking portion 41c connected with the pin 43.

Figure 10:
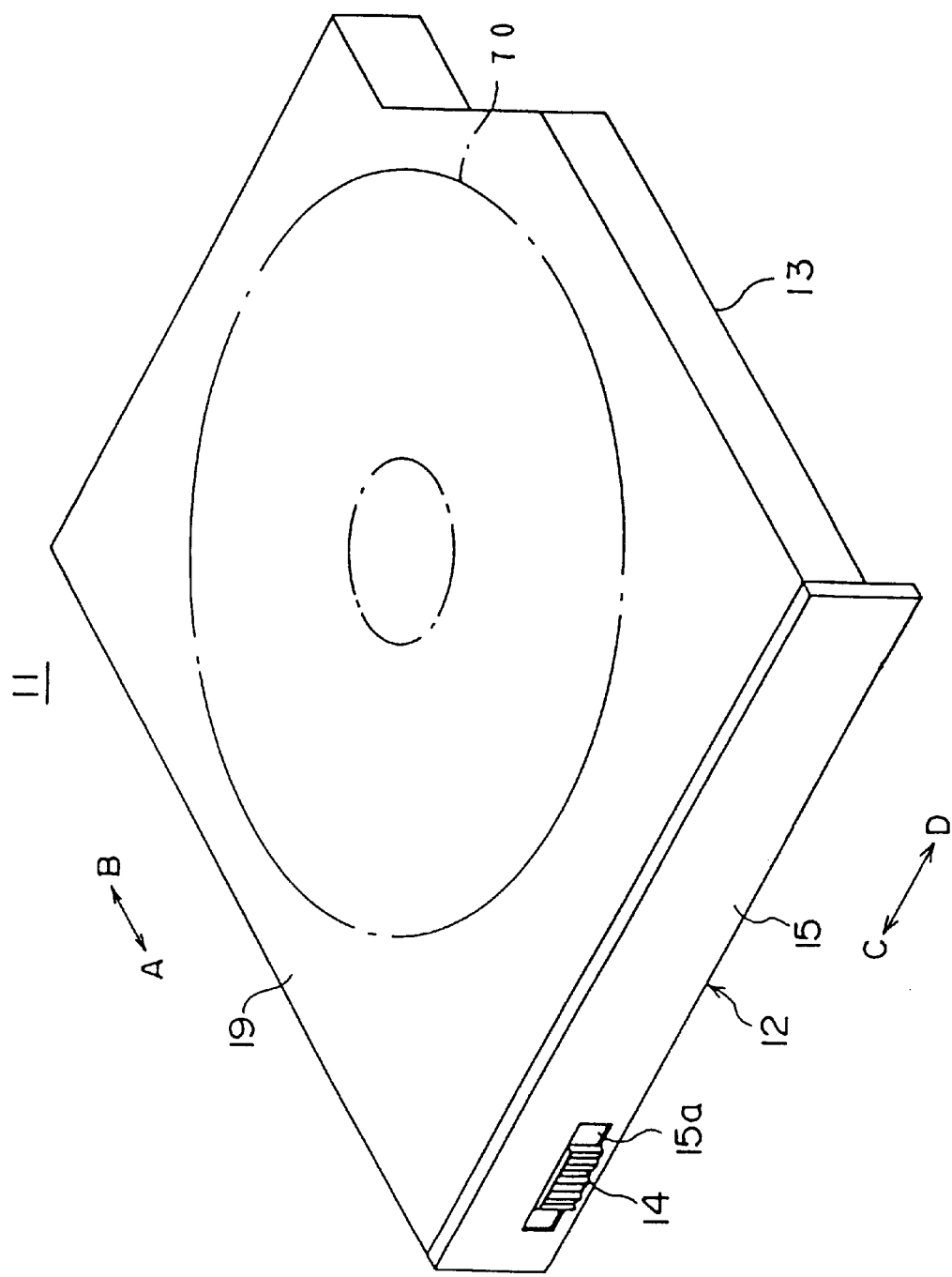
FIG. 10 is a perspective view of the optical disk drive including a variation of the disk ejection mechanism of the present embodiment.

FIG. 10 shows the CD-ROM disk drive 11 including a variation of the disk ejection mechanism of the present embodiment.

In the previous embodiment of the CD-ROM disk drive 11 in FIG. 4, the eject switch 14 and the eject member 20 are provided at the front right corner of the disk drive 11. In the present embodiment, as shown in FIG. 10, the eject switch 14 and the eject member 20 are provided at the front left corner of the CD-ROM disk drive 11. The front left corner of the tray 12 is arranged such that it confronts the optical disk 70 held by the turn table 26. In the present embodiment, it is possible that the eject switch 14 and the eject member 20 are provided at such positions that they do not interfere with the slide rail 31 at the left side of the tray 12.

Figure 11:
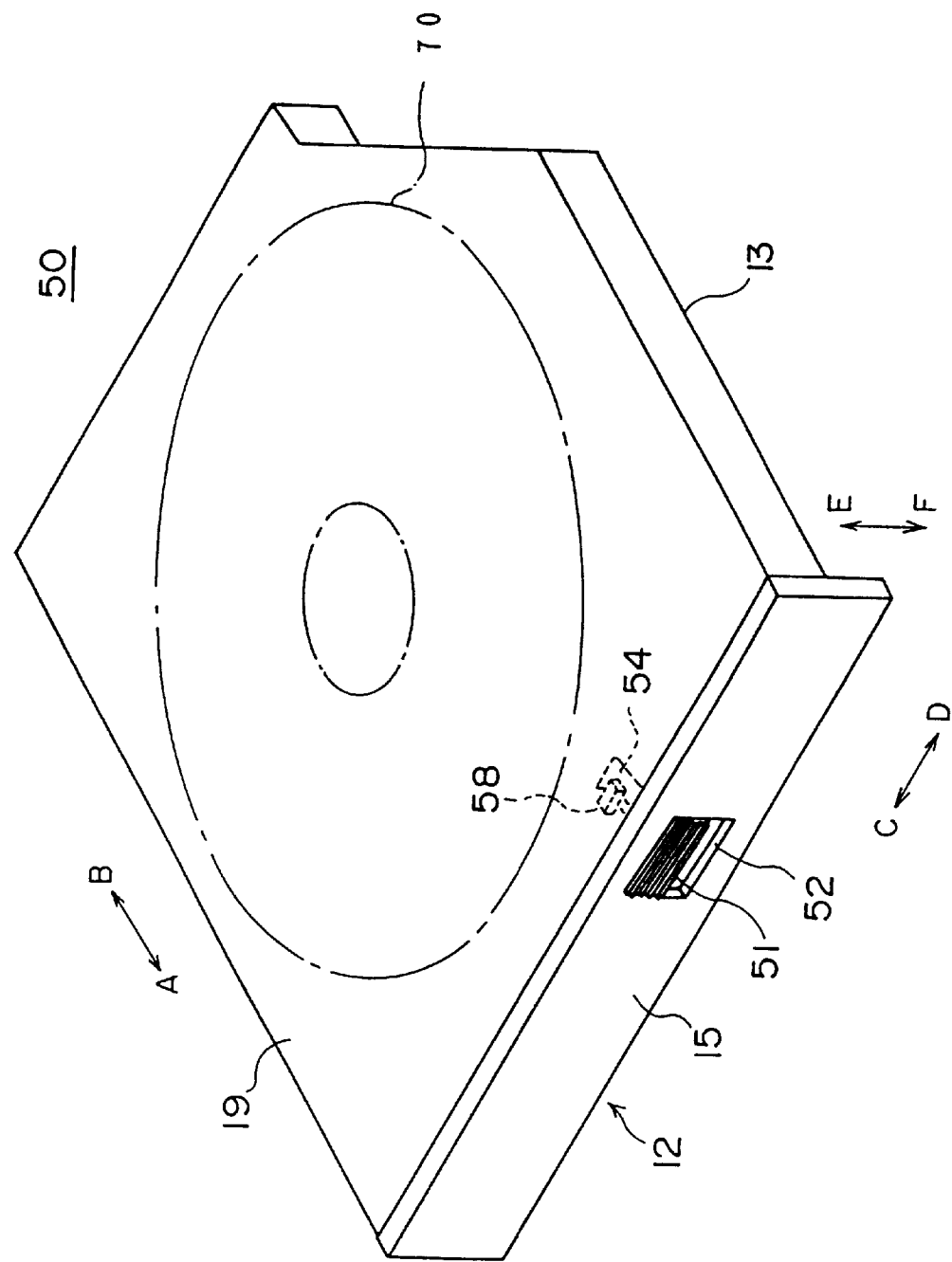
FIG. 11 is a perspective view of an optical disk drive in which a disk ejection mechanism in another embodiment of the present invention is included.

FIG. 11 shows a CD-ROM disk drive 50 in which a disk ejection mechanism in another embodiment of the present invention is included. In FIG. 11, the elements in the present embodiment which are the same as corresponding elements in FIG. 4 are designated by the same reference numerals, and a description thereof will be omitted.

Referring to FIG. 11, a slide-type eject switch 51 is provided on the front surface of the front bezel 15. A rectangular mounting hole 52 is formed in the front bezel 15. The mounting hole 52 has a vertical width which is greater than a vertical width of the mounting hole 15a of the embodiment shown in FIG. 4.

The eject switch 51 is slidable along the mounting hole 52 in both upward and downward directions indicated by arrows E and F in FIG. 11. An actuating force to push the eject switch 14 in the upward direction E is exerted by a torsion spring which will be described below. When ejecting the optical disk 70 on the tray 12 from the disk drive 50, the operator slides the eject switch 51 in the downward direction F against the actuating force.

Since the eject switch 51 is provided on the front surface of the tray 12 in the present embodiment, the operator can easily manipulate the eject switch 51, and the present embodiment provides an increased operability of the ejection of the disk 70 from the disk drive 50.

The eject switch 51 is slidable in both the upward and downward directions E and F of the disk drive 50 in the present embodiment, and an erroneous movement of the eject switch 51 in the downward direction F is avoided even when the eject switch 51 is inadvertently touched by the operator. The disk ejection mechanism of the present embodiment can prevent the tray 12 from being erroneously ejected from the chassis 18 of the disk drive 50 when the eject switch 51 is inadvertently touched by the operator.

Figure 12:
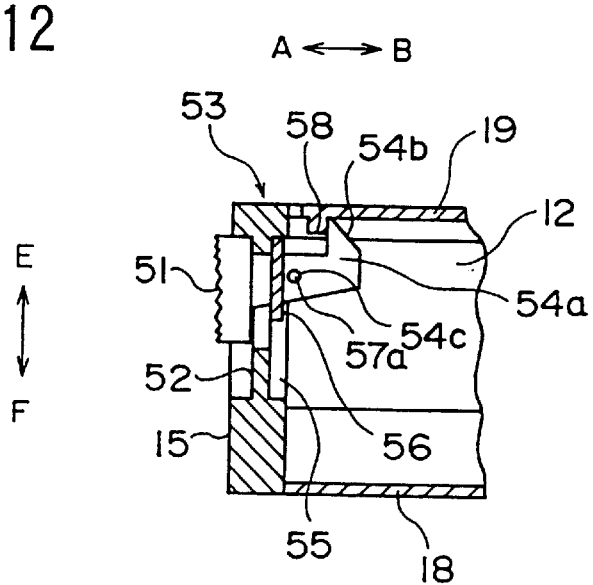
FIG. 12 is a side view of the disk ejection mechanism of the optical disk drive in FIG. 11.
Figure 13:
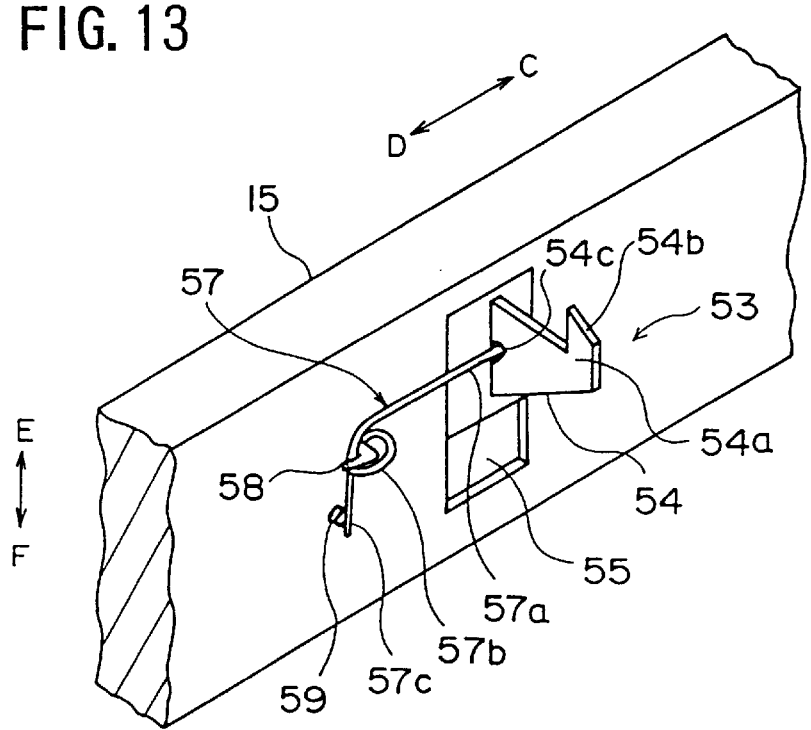
FIG. 13 is a perspective view of a rear surface of a front bezel in the optical disk drive in FIG. 11.
Figure 14:
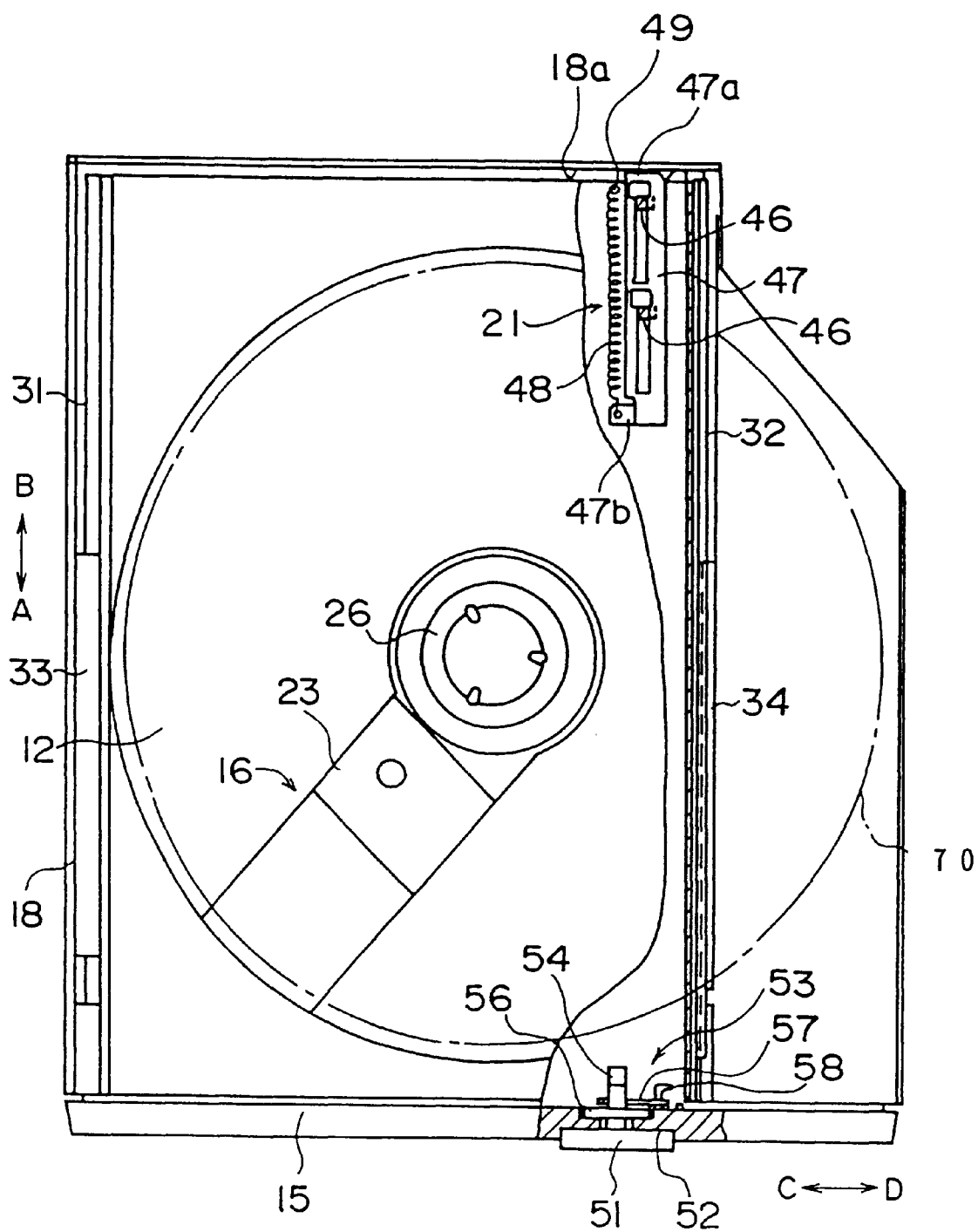
FIG. 14 is a top view of the optical disk drive in FIG. 11 when the tray is locked at an inserted position.

FIG. 12 is a side view of the disk ejection mechanism of the disk drive 50 in FIG. 11. FIG. 13 is a perspective view of a rear surface of the front bezel 15 in the disk drive 50 in FIG. 11. FIG. 14 is a top view of the disk drive 50 in FIG. 11 when the tray 12 is locked at an inserted position.

Referring to FIGS. 12 and 13, the disk ejection mechanism of the present embodiment includes a tray locking member 53. The tray locking member 53 is provided on the right side of the tray 12 such that the tray locking member 53 does not interfere with the optical disk 70 held on the tray 12. The tray locking member 53 is operated when the eject switch 51 on the front bezel 15 of the tray 12 is slid in the direction F.

The tray locking member 53 includes a lock lever 54 which extends rearward from the rear surface of the eject switch 51. A recessed portion 55 is formed in the rear surface of the front bezel 15. A flange portion 56 is fitted in the recessed portion 55 of the rear surface of the front bezel 15. A torsion spring 57 is connected at one end 57a to the lock lever 54 and connected at the other end 57c to the rear surface of the front bezel 15, so that an actuating force to push the lock lever 54 (which is formed integrally with the eject switch 51) in the upward direction E is exerted by the torsion spring 57.

The lock lever 54 of the tray locking member 53, extending rearward from the eject switch 51, passes through the front bezel 15 and further extends toward the inside of the disk drive 50. The lock lever 54 has an L-shaped cross-section, and includes a hook portion 54a and a slanting portion 54b. As shown in FIG. 12, a projection 58 extending downward from the bottom of the top plate 19 is connected with the hook portion 54a of the lock lever 54 when the tray 12 is locked at the inserted position. When the tray 12 is placed from the eject position to the inserted position, the slanting portion 54b of the lock lever 54 is passed by the projection 58, and then the hook portion 54a is connected with the projection 58.

The lock lever 54 has a through-hole 54c, and one end 57a of the torsion spring 57 is inserted into the through-hole 54c of the lock lever 54.

The flange portion 56, provided on the periphery of the lock lever 54, is fitted in the recessed portion 55 of the rear surface of the front bezel 15 such that the flange portion 56 is movable up and down within the recessed portion 55. A separation of the lock lever 54 from the recessed portion 55 of the front bezel 15 is prevented by the torsion spring 57 one end of which is inserted into the through-hole 54c of the lock lever 54.

The tray locking member 53 of the present embodiment is arranged such that the eject switch 51 and the lock lever 54 are slidable in both the upward and downward directions E and F. A total width of the disk ejection mechanism of the present embodiment in the right and left directions D and C of the disk drive 50 can be reduced, and the present embodiment makes it possible to design an optical disk drive having a smaller size.

The torsion spring 57 includes a coil portion 54b. An L-shaped pin 58 is embedded on the rear surface of the front bezel 15. The coil portion 54b of the torsion spring 57 is supported by the L-shaped pin 58. A boss 59 extending rearward from the rear surface of the front bezel 15 is provided. One end 57a of the torsion spring 57 is inserted into the through-hole 54c of the lock lever 54, and the other end 57c thereof is connected with the boss 59. Thus, the actuating force to push the lock lever 54 in the direction E is exerted by the torsion spring 57 as shown in FIG. 13.

Before the eject switch 51 is slid in the direction F to eject the tray 12 from the chassis 18 of the disk drive 50, the eject switch 51 and the lock lever 54 integrally formed with the eject switch 51 are pushed in the upward direction E by the actuating force of the torsion spring 57. Since the lock lever 54 at this position is connected with the projection 58 on the bottom of the top plate 19, the tray 12 is locked at the inserted position by the lock lever 54.

Figure 15:
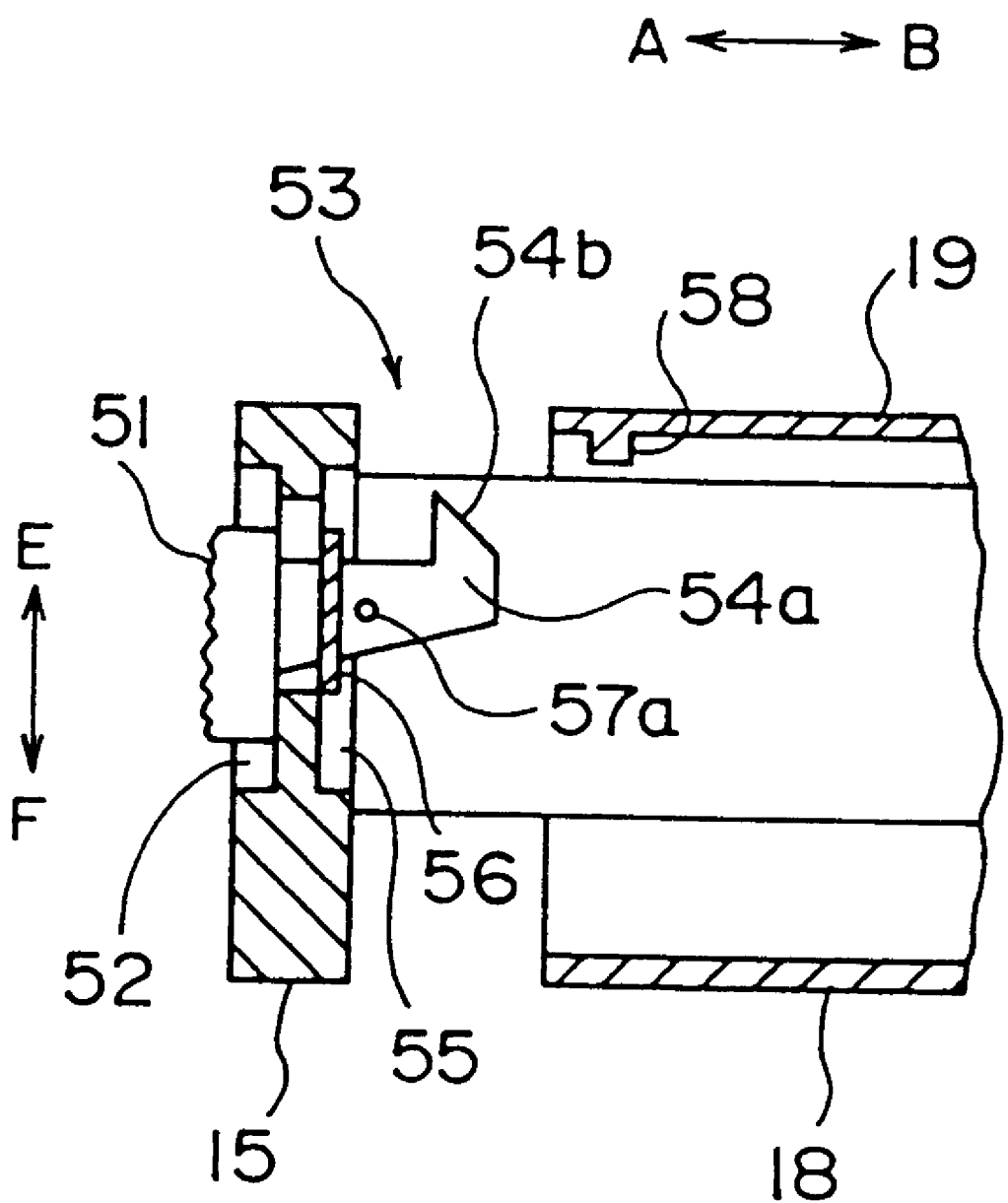
FIG. 15 is a side view of the disk ejection mechanism when the tray is ejected to an eject position.
Figure 16:
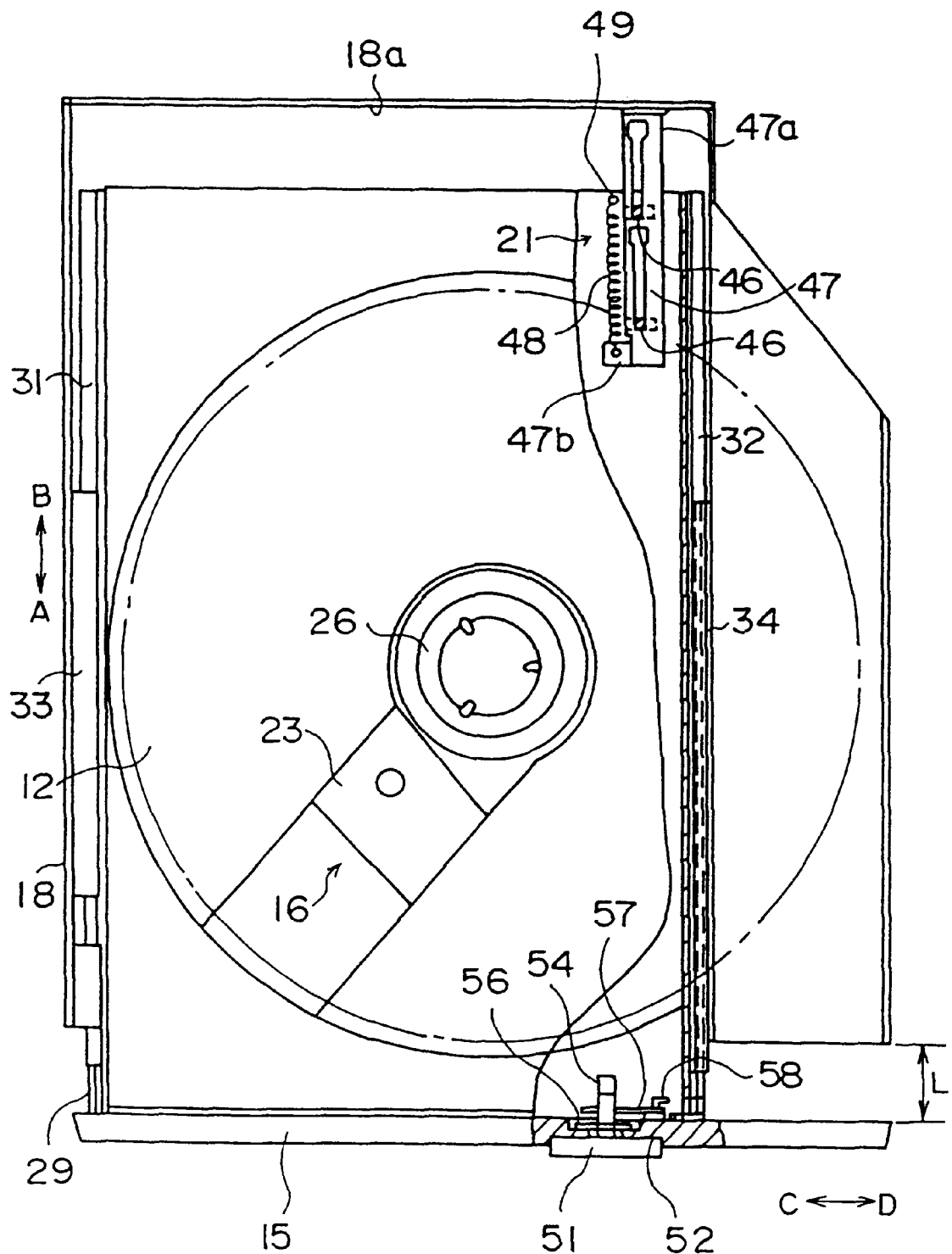
FIG. 16 is a top view of the disk ejection mechanism when the tray is ejected to the eject position.

FIG. 15 is a side view of the disk ejection mechanism of the present embodiment when the tray 12 is ejected to the eject position. FIG. 16 is a top view of the disk ejection mechanism of the present embodiment when the tray 12 is ejected to the eject position.

When the eject switch 51 is slid in the direction F by the operator against the actuating force of the torsion spring 57, as shown in FIG. 15, the lock lever 54 is moved in the downward direction F by the eject switch 51. The hook portion 54a of the lock lever 54 is released from the projection 58 on the bottom of the top plate 19. Thus, the lock lever 54 at this time is unlocked from the projection 58.

Similarly to the previous embodiment in FIG. 6, the tray pushing member 21 pushes the tray 12 in the eject direction A by using the actuating force of the coil spring 48, as shown in FIG. 16. When the lock lever 54 is unlocked from the projection 58, the tray 12 is moved in the eject direction A by the tray pushing member 21.

When the tray 12 is placed by the above eject operation at the eject position shown in FIG. 16, the front bezel 15 in front of the tray 12 is at the predetermined distance L from the front end of the chassis 18 of the disk drive 50. This facilitates the operator to further pull out the tray 12 from the chassis 18, to the disk-change position.

When the operator releases the eject switch 51 on the front bezel 15, the eject switch 51 and the tray locking member 54 are returned back in the upward direction E due to the actuating force of the torsion spring 57.

After the optical disk 70 is changed at the disk-change position, the front bezel 15 in front of the tray 12 is pushed in the direction B by the operator. When the tray 12 is further pushed in the direction B from the position shown in FIG. 16, the slanting portion 54b of the lock lever 54 comes into contact with the projection 58 on the bottom of the top plate 19, and the hook portion 54a of the lock lever 54 is then connected with the projection 58. When the tray 12 is placed again at the inserted position, the lock lever 41 is locked by the connection of the hook portion 54a and the projection 58.

Figure 17:
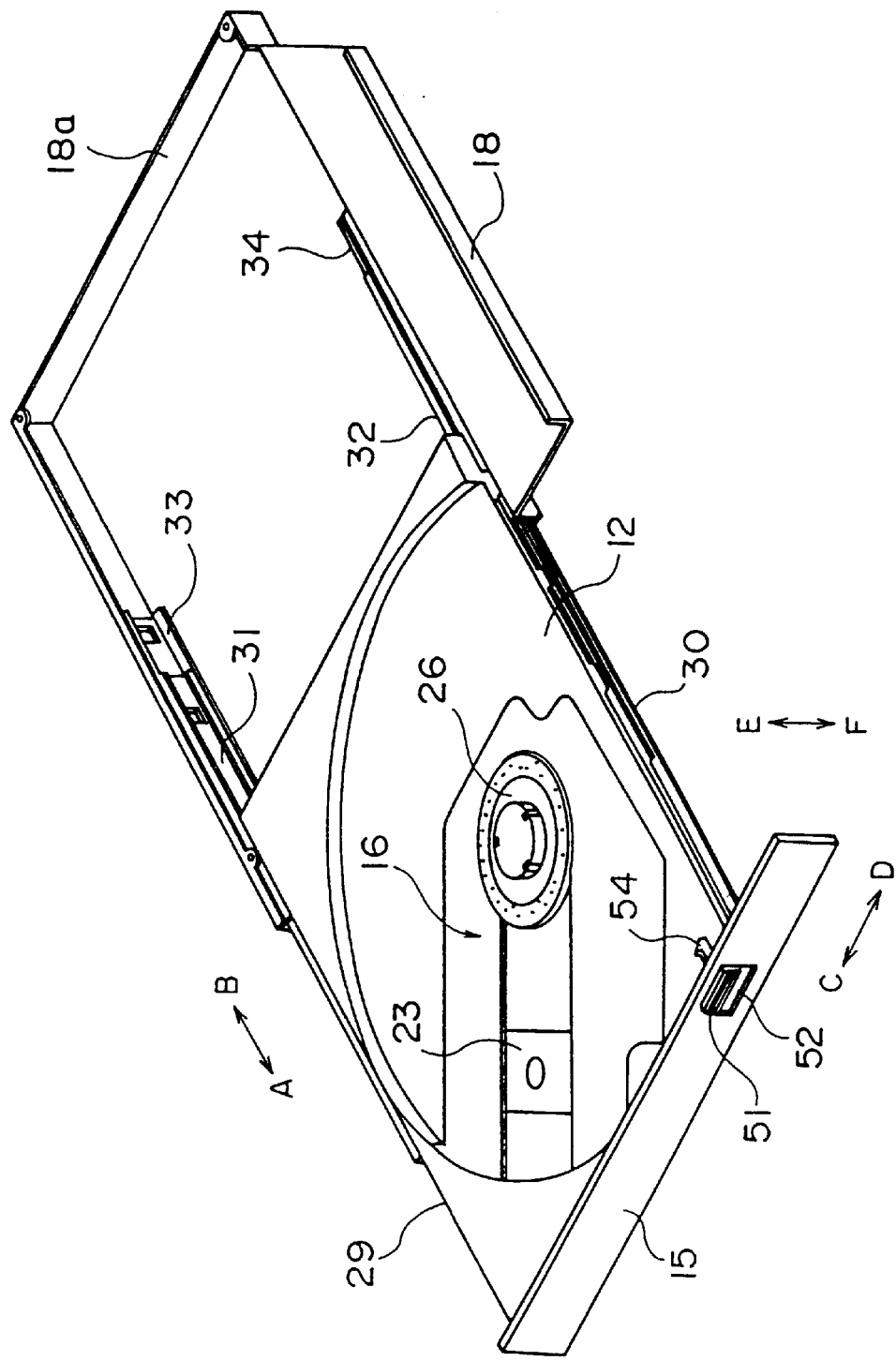
FIG. 17 is a perspective view of the optical disk drive in FIG. 11 when the tray is at a disk-change position.

FIG. 17 shows the CD-ROM disk drive 50 when the tray 12 is pulled out to the disk-change position.

As described above, after the ejection operation of the tray 12 is performed, the front bezel 15 in front of the tray 12 is at the predetermined distance L from the front end of the chassis 18, as shown in FIG. 16. Then, the operator grips the front bezel 15 and further pulls out the tray 12 in the direction A from the position shown in FIG. 16. By this operation, the slide rails 31 and 32 which support the side edges of the tray 12 are slid in the direction A, and the tray 12, which is held by the guide units 33 and 34 via the slide rails 31 and 32, is slid in the direction A to the disk-change position, as shown in FIG. 17.

When the tray 12 is moved to the disk-change position, the optical disk, held by the turn table 26, is exposed. After the optical disk is changed at this disk-change position, the front bezel 15 in front of the tray 12 is pushed in the direction B by the operator. When the tray 12 is further pushed in the direction B from the disk-change position shown in FIG. 17, the slanting portion 54b of the lock lever 54 comes into contact with the projection 58, and the hook portion 54a of the lock lever 54 is connected with the projection 58. The tray 12 is again locked at the inserted position shown in FIG. 14, and the lock lever 54 is locked with the hook portion 54a which is connected with the projection 58.

Figure 18:
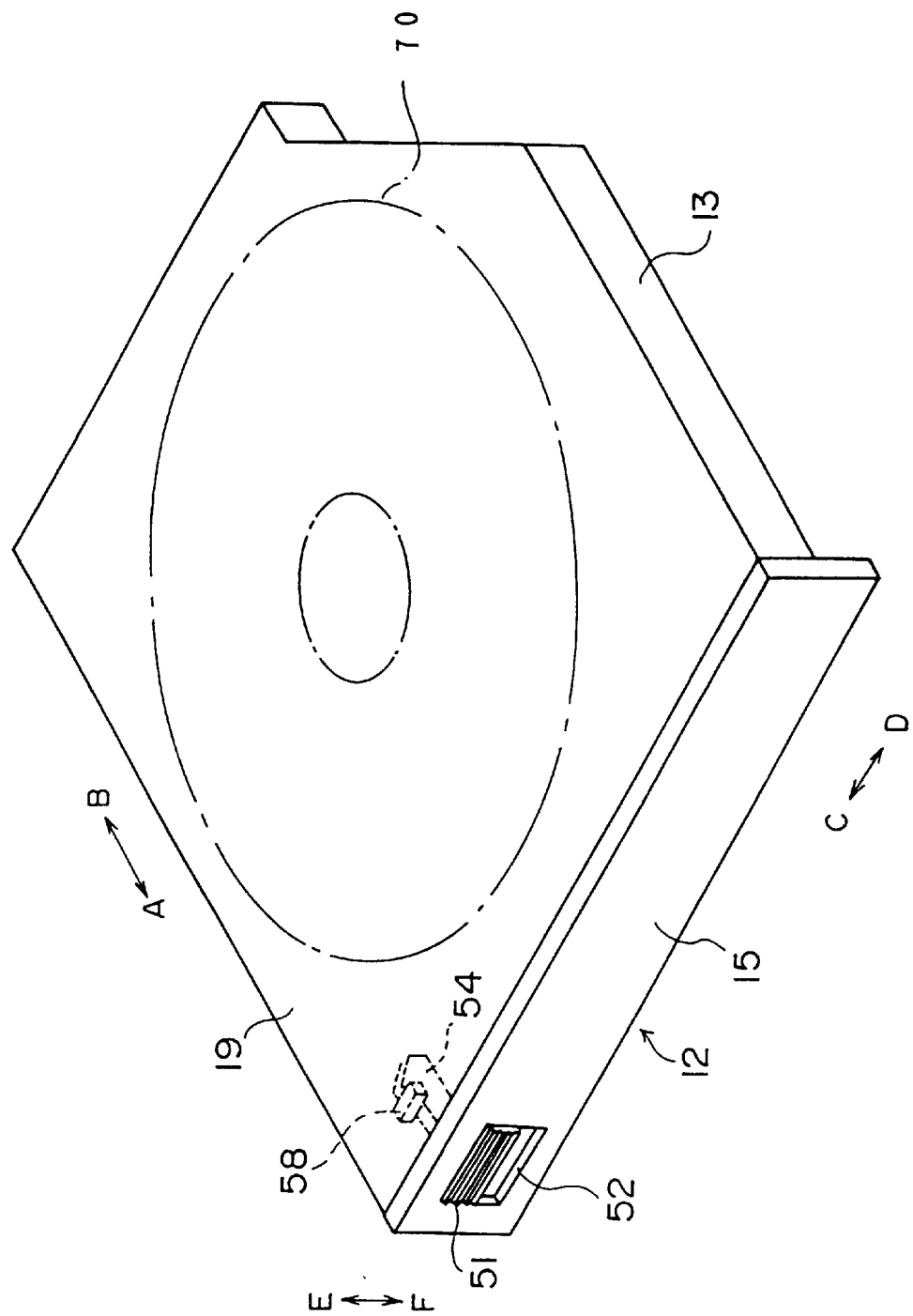
FIG. 18 is a perspective view of the optical disk drive including a variation of the disk ejection mechanism of the present embodiment.

FIG. 18 shows the CD-ROM disk drive including a variation of the disk ejection mechanism of the present embodiment.

In the previous embodiment of the CD-ROM disk drive 50 in FIG. 11, the eject switch 51 and the eject member 53 are provided on the front bezel 15 at the right side thereof. In the present embodiment, as shown in FIG. 18, the eject switch 51 and the eject member 53 are provided on the front bezel 15 at the left side thereof. The front left corner of the tray 12 is arranged such that it confronts the optical disk 70 held by the turn table 26. In the present embodiment, it is possible that the eject switch 51 and the eject member 53 are provided at such positions that they do not interfere with the slide rail 31 at the left-side edge of the tray 12.

Figure 19:
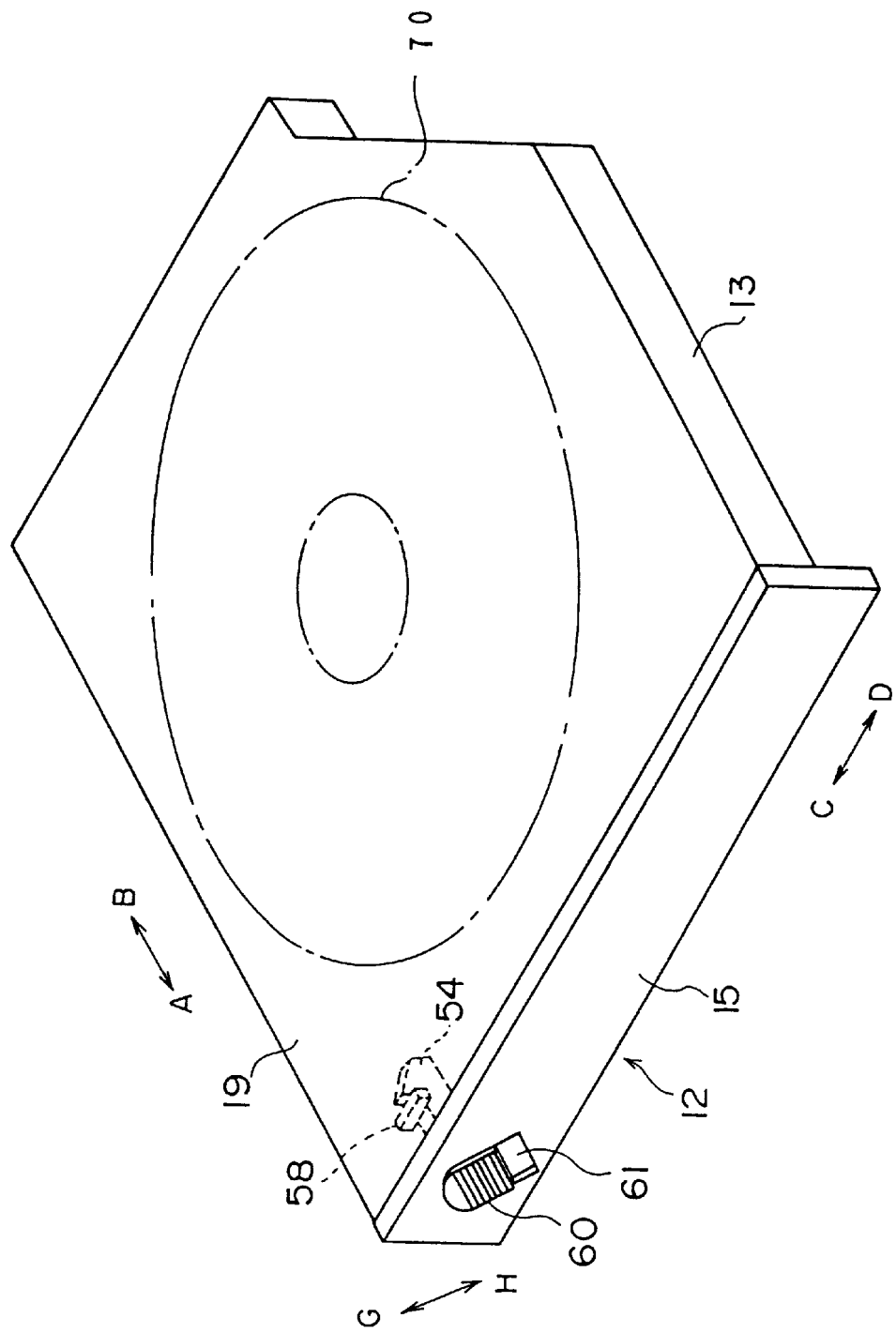
FIG. 19 is a perspective view of the optical disk drive including a further variation of the disk ejection mechanism of the present embodiment.

FIG. 19 shows the CD-ROM disk drive including a further variation of the disk ejection mechanism of the present embodiment.

In the previous embodiment of the CD-ROM disk drive 50 in FIG. 11, the disk ejection mechanism is arranged such that the eject switch 51 is slidable in both the upward and downward directions E and F. In the present embodiment, as shown in FIG. 19, the disk ejection mechanism is arranged such that a slide-type eject switch 60 is slidable in both an upward slanting direction and a downward slanting direction, indicated by an arrow G and an arrow H in FIG. 19, respectively. The upward and downward slanting directions G and H in FIG. 19 are at 45 degrees to the upward and downward directions E and F in FIG. 11.

The eject switch 60 is, for example, provided on the front bezel 15 at the left side of the disk drive. A rectangular mounting hole 61 is provided 52 on the front bezel 15 at a corresponding location in the slanting manner similar to that of the eject switch 60.

The eject switch 60 is slidable along the mounting hole 61 in both the upward and downward slanting directions G and H as shown in FIG. 19. An actuating force to push the eject switch 60 in the upward slanting direction G is exerted. When ejecting the optical disk 70 on the tray 12 from the disk drive, the operator slides the eject switch 60 in the downward slanting direction H against the actuating force. When the eject switch 60 is slid in the direction H by the operator, the ejection operation of the tray 12 is performed by the eject member 53 in the similar manner as described in the previous embodiment.

According to the present invention, it is possible to arrange a further embodiment of the disk ejection mechanism in which a slide-type eject switch is slidable on the front bezel 15 in both a right-upward slanting direction and a left-downward slanting direction, which are perpendicular to the slanting directions G and H shown in FIG. 19.

The disk ejection mechanism of the present invention can be applied to not only the CD-ROM disk drive (as in the above-described embodiments) but also a compact disk drive, a magnetic disk drive, a magneto-optical disk drive, and any other optical disk drive.

Further, the disk ejection mechanisms of the above-described embodiments are for use with an optical disk drive built in a notebook-size personal computer. However, the present invention is not limited to the above-described embodiments, and it is also applicable to a disk ejection mechanism for a disk drive built in a desktop personal computer or any other electronics device.

What is claimed is:

1. A disk ejection mechanism of a disk drive, comprising:

a tray on which a recording disk is held, said tray being arranged in the disk drive so that the tray is movable between an inserted position and a disk-change position in both an insert direction and an eject direction;

a tray locking member, having a locking portion provided on said tray, for inhibiting a tray movement of said tray in the eject direction to lock said tray by connecting said locking portion with a pin fixed to a chassis of the disk drive when said tray is at the inserted position, wherein the locking portion is movable to the fixed pin on the tray in a lateral direction which is perpendicular to both the insert direction and the eject direction;

a tray pushing member for exerting an actuating force on said tray to push said tray in the eject direction when said tray is at the inserted position, such that said locking portion provided on said tray is pressed onto the pin, said tray being ejected by said tray pushing member when said tray is unlocked from said tray locking member; and a slidably-arranged eject switch, associated with said locking portion of said tray locking member for unlocking said tray from the tray locking member, wherein said eject switch is slidably arranged on a front surface of the disk drive in front of said tray such that said eject switch is movable on said front surface in a lateral direction which is perpendicular to both the insert direction and the eject direction and parallel to said front surface, said tray locking member is moved by a switch movement of the eject switch in a direction which is substantially the same as the lateral direction of the movement of the eject switch, so that the tray is unlocked from the tray locking member, the actuating force of the tray pushing member, when the tray is at the inserted position, acts on the tray in the eject direction opposite to the insert direction strengthening the connection of the locking portion and the pin when the tray is at the inserted position and the eject switch is not pressed, and when the eject switch is pressed against the actuating force, the locking portion is disconnected from the pin and the force acting to press the locking portion onto the pin is canceled by the disconnection, thereby the tray locking member permitting the tray movement in the eject direction by the actuating force of the tray pushing member when the tray is unlocked from the tray locking member.

2. The disk ejection mechanism according to claim 1, wherein said eject switch is movable on said front surface in right and left transverse directions.

3. The disk ejection mechanism according to claim 1, wherein said tray locking member comprises a coil spring connected with a lock lever of said tray locking member.

4. The disk ejection mechanism according to claim 1, wherein said tray locking member comprises a lever which is pushed in a transverse direction.

* * * * *